(12) United States Patent
Ninoyu et al.

(10) Patent No.: US 10,569,754 B2
(45) Date of Patent: Feb. 25, 2020

(54) VALVE CONTROL DEVICE, LIQUID PRESSURE CONTROL DEVICE, AND VALVE CONTROL METHOD

(71) Applicants: ADVICS CO., LTD., Kariya-shi, Aichi (JP); TOYOTA JIDOSHA KABUSHIKI KAISHA, Toyota-shi, Aichi (JP)

(72) Inventors: Masaki Ninoyu, Obu (JP); Takahiro Okano, Chiryu (JP)

(73) Assignees: ADVICS CO., LTD., Kariya-Shi, Aichi (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 104 days.

(21) Appl. No.: 15/778,948

(22) PCT Filed: Nov. 25, 2016

(86) PCT No.: PCT/JP2016/085063
§ 371 (c)(1),
(2) Date: May 24, 2018

(87) PCT Pub. No.: WO2017/090753
PCT Pub. Date: Jun. 1, 2017

(65) Prior Publication Data
US 2018/0345942 A1    Dec. 6, 2018

(30) Foreign Application Priority Data

Nov. 27, 2015    (JP) .................................. 2015-232475

(51) Int. Cl.
*B60T 15/36*    (2006.01)
*B60T 8/36*    (2006.01)
(Continued)

(52) U.S. Cl.
CPC .............. *B60T 15/36* (2013.01); *B60T 7/042* (2013.01); *B60T 8/36* (2013.01); *B60T 8/4077* (2013.01);
(Continued)

(58) Field of Classification Search
CPC .... B60T 13/142; B60T 13/146; B60T 13/662; B60T 13/686; B60T 15/028; B60T 15/36;
(Continued)

(56) References Cited

U.S. PATENT DOCUMENTS 8,870,301 B2 * 10/2014 Ohkubo ................ B60T 8/3655
303/116.1
2003/0183280 A1 * 10/2003 Ishii .................... F16H 61/0251
137/487.5
(Continued)

FOREIGN PATENT DOCUMENTS

| JP | 2005-38314 A | 10/2005 |
| JP | 2011-66177 | * 3/2011 |
| JP | 2013-111998 A | 6/2013 |

OTHER PUBLICATIONS

International Search Report (PCT/ISA/210) dated Feb. 28, 2017, by the Japanese Patent Office as the International Searching Authority for International Application No. PCT/JP2016/085063.
(Continued)

*Primary Examiner* — Chun Cao
(74) *Attorney, Agent, or Firm* — Buchanan Ingersoll & Rooney PC

(57)    ABSTRACT

A valve control device includes a correction unit that corrects hysteresis in output of a control valve according to an increasing/reducing direction of a control output value; a detection unit configured to detect an actual output value to the control valve corresponding to the control output value; and a forbidding unit configured to forbid correction by the
(Continued)

correction unit, until a difference between the control output value and the actual output value becomes within a predetermined range, after the increasing/reducing direction of the control output value is switched.

6 Claims, 5 Drawing Sheets

(51) Int. Cl.
    *B60T 13/14*      (2006.01)
    *B60T 8/40*      (2006.01)
    *B60T 7/04*      (2006.01)
    *B60T 13/68*      (2006.01)
    *B60T 13/66*      (2006.01)
    *B60T 15/02*      (2006.01)

(52) U.S. Cl.
    CPC .......... *B60T 13/146* (2013.01); *B60T 13/662* (2013.01); *B60T 13/686* (2013.01); *B60T 15/028* (2013.01); *B60T 8/3605* (2013.01); *B60T 13/142* (2013.01); *F15B 2211/6656* (2013.01)

(58) Field of Classification Search
    CPC .......... B60T 7/042; B60T 8/36; B60T 8/3605; B60T 8/4077
    See application file for complete search history.

(56) References Cited

U.S. PATENT DOCUMENTS

| | | | | |
|---|---|---|---|---|
| 2005/0006487 | A1* | 1/2005 | Suda | F01P 7/167 236/46 R |
| 2011/0285199 | A1* | 11/2011 | Ishida | B60T 7/042 303/3 |
| 2012/0109385 | A1* | 5/2012 | Morita | F15B 19/002 700/281 |
| 2014/0327296 | A1* | 11/2014 | Ishida | B60T 7/042 303/10 |
| 2015/0353090 | A1* | 12/2015 | Yoshino | B60W 10/04 701/54 |
| 2017/0120882 | A1* | 5/2017 | Ninoyu | B60T 8/4077 |

OTHER PUBLICATIONS

Written Opinion (PCT/ISA/237) dated Feb. 28, 2017, by the Japanese Patent Office as the International Searching Authority for International Application No. PCT/JP2016/085063.

* cited by examiner

VALVE CONTROL DEVICE, LIQUID PRESSURE CONTROL DEVICE, AND VALVE CONTROL METHOD

CROSS-REFERENCE TO RELATED APPLICATIONS

This application is national stage application of International Application No. PCT/JP2016/085063, filed Nov. 25, 2016, which designates the United States, incorporated herein by reference, and which is based upon and claims the benefit of priority from Japanese Patent Application No. 2015-232475, filed Nov. 25, 2015, the entire contents of which are incorporated herein by reference.

TECHNICAL FIELD

The present invention relates to a valve control device, a liquid pressure control device, and a valve control method.

BACKGROUND ART

Conventionally, a liquid pressure control device including a linear control valve (what is called a motor-operated valve) that adjusts the pressure and flow rate of a fluid to be supplied to a controlled object, by electrically controlling the opening/closing state of a pressure-increasing valve and a pressure-reducing valve, and adjusting the pilot pressure has been known (for example, Patent Document 1).

CITATION LIST

Patent Literature

Patent Document 1: Japanese Patent Application Laid-open No. 2005-038314

SUMMARY OF INVENTION

Problem to be Solved by the Invention

In the liquid pressure control device such as the above, to control the flow rate that is output of the linear control valve, hysteresis is present between the increasing control characteristics when changing the control output (for example, a target current value) to increase the flow rate (for example, to increase the opening degree of the linear control valve), and the reducing control characteristics when changing the control output to reduce the flow rate (for example, to reduce the opening degree of the linear control valve).

Not only feedback control but also feed-forward control may be performed in the active hydraulic boost (AHB) control.

When the feed-forward control is performed like this, the actual opening degree of the linear control valve may not coincide with the opening degree corresponding to the control output, and thus there is a possibility of not being able to accurately control the valve. For example, when the control output is switched from being increased to being reduced, the control output is reduced by the above-described reducing control characteristics even though the opening degree of the linear control valve has not increased to the target opening degree, which results in that the opening degree may not reach the target. Thus, it may not be possible to control the valve accurately.

Consequently, an object of the present invention is to provide a liquid pressure control device that can bring the output of the linear control valve close to the target, while taking hysteresis into account, even in the above-described situation.

Means for Solving Problem

A valve control device according to the present invention, includes: a correction unit configured to correct hysteresis in output of a control valve according to an increasing/reducing direction of a control output value; a detection unit configured to detect an actual output value to the control valve corresponding to the control output value; and a forbidding unit configured to forbid correction by the correction unit, until a difference between the control output value and the actual output value becomes within a predetermined range, after the increasing/reducing direction of the control output value is switched.

With the above-described valve control device, the forbidding unit forbids correction by the correction unit until a difference between the control output value and the actual output value detected by the detection unit becomes within a predetermined range. Consequently, it is possible to suppress unnecessary hysteresis correction and bring the output of the control valve close to the target.

In this case, the valve control device may further include a control unit configured to control the control valve and supply driving current to the control valve, the control valve may be a linear control valve, the control output value may be a value of target current for the linear control valve set by the control unit, and the actual output value may be a value of actual current that is actually supplied to the linear control valve by the control unit.

With the above-described valve control device, when the control unit supplies driving current to the linear control valve, the control unit can bring the output of the linear control valve closer to the target, and ensure the performance of the linear control valve certainly.

Further, the control unit may be configured to separately control a pressure-increasing-side linear control valve for increasing pressure or flow rate of a fluid when adjusting the pressure or the flow rate of the fluid to be supplied to a controlled object, and a pressure-reducing-side linear control valve for reducing pressure or flow rate of a fluid when adjusting the pressure or the flow rate of the fluid to be supplied to the controlled object, and adjust pilot pressure.

Consequently, it is possible to bring the pilot pressure close to the target with good responsiveness, and bring the adjustment of the pressure or the flow rate of the fluid to be supplied to controlled object close to the target.

Further, the control unit may be configured to set the control output value by a feed-forward control.

With the above-described configuration, it is possible to bring the output of the control value close to the target in the feed-forward control.

Further, a liquid pressure control device according to the present invention, includes: a pressure-increasing-side linear control valve configured to increase pressure or flow rate of a fluid to be supplied to a controlled object when adjusting the pressure or the flow rate of the fluid; a pressure-reducing-side linear control valve configured to reduce pressure or flow rate of a fluid to be supplied to the controlled object when adjusting the pressure or the flow rate of the fluid; and a valve control device configured to separately control the pressure-increasing-side linear control valve and the pressure-reducing-side linear control valve, to adjust pilot pressure and adjust the pressure or the flow rate of the fluid to be supplied to the controlled object, wherein the valve control device includes: a correction unit configured to separately perform hysteresis corrections on the pressure-increasing-side linear control valve and the pressure-reducing-side linear control valve having hysteresis in outputs, according to increasing/reducing directions of target values of control outputs; and a control unit configured to forbid the hysteresis corrections until differences between the target values and actual output values of the control outputs become within predetermined ranges, when the target values of the control outputs are switched to reverse directions.

With the above-described liquid pressure control device, when the control unit supplies driving current to the pressure-increasing-side linear control valve and the pressure-reducing-side linear control valve, the control unit can bring the outputs of the pressure-increasing-side linear control valve and the pressure-reducing-side linear control valve close to the targets, and ensure the performance of the linear control valve certainly. Consequently, it is possible to bring not only the pilot pressure but also the pressure or the flow rate of the fluid to be supplied to the controlled object close to the target.

Further, a valve control method includes: correcting hysteresis in output of a control valve according to an increasing/reducing direction of a control output value; detecting an actual output value to the control valve corresponding to the control output value; and forbidding the correcting until a difference between the control output value and the actual output value becomes within a predetermined range, after the increasing/reducing direction of the control output value is switched.

With the above-described valve control method, the forbidding forbids the correction until the difference between the control output value and the actual output value detected by the detecting unit becomes within a predetermined range. Consequently, it is possible to suppress unnecessary hysteresis correction and bring the output of the control valve close to the target.

DESCRIPTION OF EMBODIMENTS

Exemplary embodiments of the present invention will now be disclosed. The configuration of the following embodiment, and operations and results (effects) provided by the configuration are merely examples. The present invention can also be implemented by the configuration other than that disclosed in the following embodiment. Moreover, with the present invention, it is possible to obtain at least one of various effects (including secondary effects) based on the configuration. In the present application, ordinal numbers are assigned to differentiate components, elements, and the like for convenience sake, and are not intended to indicate priority or order.

A braking device of a vehicle such as an automobile that is provided with an oil pump, which is driven by a motor, in the middle of a hydraulic conductive pipe and that keeps accumulator pressure high by accumulating the hydraulic liquid on the discharging side of the oil pump in the accumulator has been known. The high-pressure hydraulic liquid can exert a desired braking force by being supplied to a wheel cylinder via a pressure-increasing valve among a plurality of control valves provided in each of the wheels, according to the brake pedal operation of the driver. A liquid pressure control device in which a target oil pressure corresponding to the desired control force is determined according to the brake pedal operation, and the control valve provided on each of the wheels is opened or closed to control the actual oil pressure such that the actual oil pressure comes close to the target oil pressure, has been known (for example, see Patent Document 1).

The present embodiment relates to a liquid pressure control device like the above and a valve control device that controls a control valve included in the liquid pressure control device.

Hereinafter, details will be described.

First, a schematic configuration of a liquid pressure control device will be described.

Figure 1:
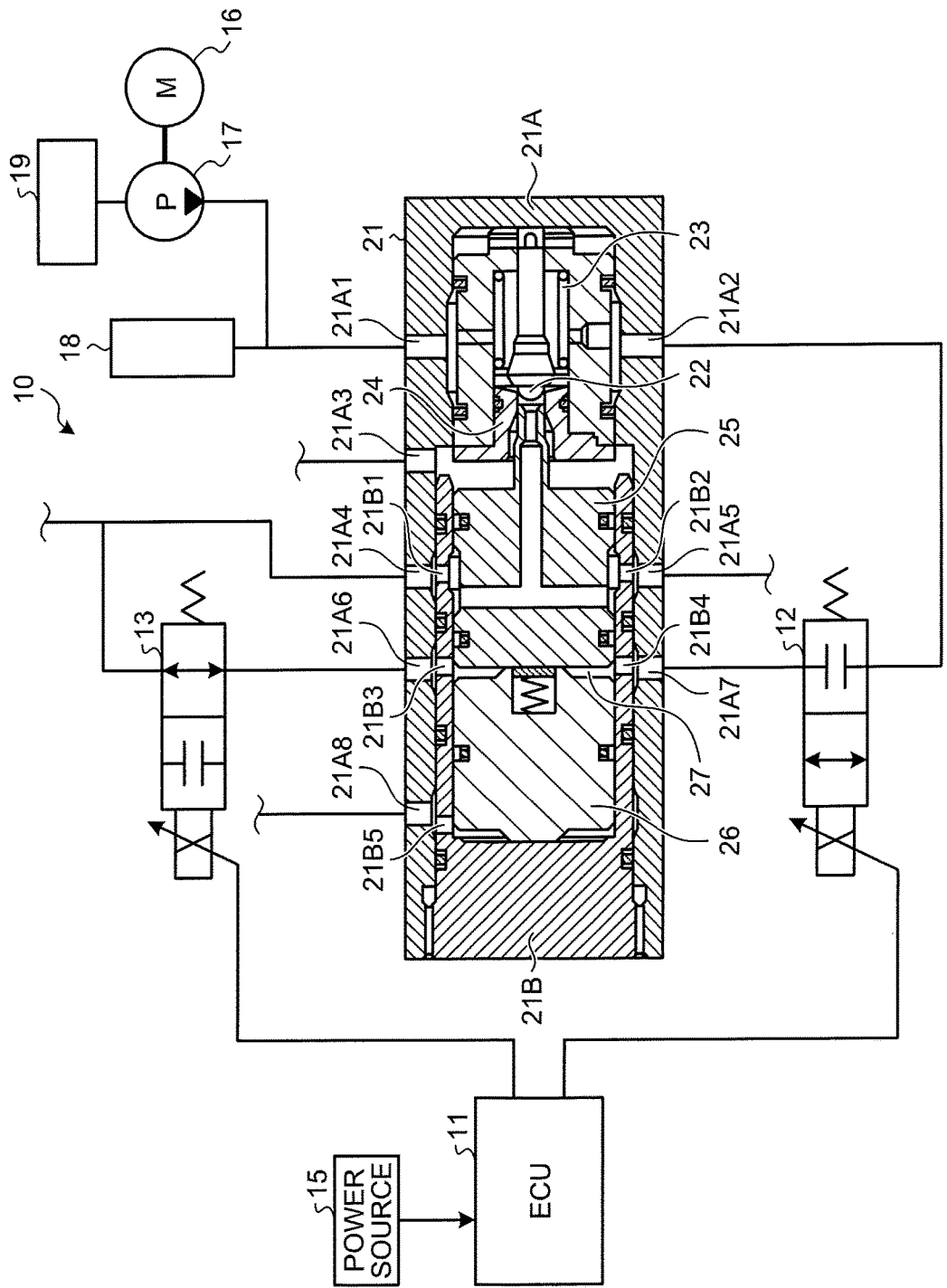
FIG. 1 is a schematic configuration diagram of a liquid pressure control device.

FIG. 1 is a schematic configuration diagram of the liquid pressure control device.

A liquid pressure control device 10 includes an electric control unit (ECU) 11 that controls the entire liquid pressure control device 10, a pressure-increasing-side linear control valve 12 to which control current is supplied from the ECU 11 and that functions as a pressure-increasing valve for increasing the liquid pressure, a pressure-reducing-side linear control valve 13 to which control current is supplied from the ECU 11 and that functions as a pressure-reducing valve for reducing the liquid pressure, a regulator 14 to which the pressure-increasing-side linear control valve 12 and the pressure-reducing-side linear control valve 13 are connected and that generates a predetermined liquid pressure, a power source 15 for supplying electric power to the pressure-increasing-side linear control valve 12 and the pressure-reducing-side linear control valve 13 via the ECU 11, a motor 16, a hydraulic pressure pump 17 driven by the motor 16, an accumulator 18 for accumulating high pressure hydraulic liquid (fluid), and a reservoir 19 for storing the hydraulic liquid.

In general, the regulator 14 includes a cylinder 21, a ball valve 22, a biasing portion 23, a valve seat portion 24, a control piston 25, and a sub-piston 26.

The cylinder 21 includes a cylinder case 21A formed into a substantially bottomed cylinder shape and a lid body 21B that covers the opening of the cylinder case 21A.

A plurality of ports 21A1 to 21A8 are formed in the cylinder case 21A.

A plurality of ports 21B1 to 21B5 corresponding to the ports 21A4 to 21A8 of the cylinder case 21A are formed in the lid body 21B.

The hydraulic pressure pump 17 and the accumulator 18 are connected to the port 21A1 of the cylinder case 21A, and one of pipes of the pressure-increasing-side linear control valve 12 is connected to the port 21A2.

Moreover, one of pipes of the pressure-reducing-side linear control valve 13 is connected to the port 21A4 of the cylinder case 21A, and the other pipe of the pressure-reducing-side linear control valve 13 is connected to the port 21A6.

Furthermore, the other pipe of the pressure-increasing-side linear control valve 12 is connected to the port 21A7 of the cylinder case 21A.

A pilot chamber 27 is formed between the port 21A6 and the port 21A7.

In such a configuration, the pressure of the hydraulic liquid in the pilot chamber 27 is increased, as the opening degree of the pressure-increasing-side linear control valve 12 is increased, or as the opening degree of the pressure-reducing-side linear control valve 13 is reduced. The pressure of the hydraulic liquid in the pilot chamber 27 is reduced, as the opening degree of the pressure-increasing-side linear control valve 12 is reduced, or as the opening degree of the pressure-reducing-side linear control valve 13 is increased.

The ECU 11 controls the opening degrees of the pressure-increasing-side linear control valve 12 and the pressure-reducing-side linear control valve 13, and the flow rate of the hydraulic liquid that passes through the pressure-increasing-side linear control valve 12 and the pressure-reducing-side linear control valve 13.

The pressure-increasing-side linear control valve 12 is what is called a normally closed type (NC type) valve that is closed in a non-energized state. The pressure-reducing-side linear control valve 13 is what is called a normally open type (NO type) valve that is opened in the non-energized state.

Next, a control operation of the pressure-increasing-side linear control valve 12 and the pressure-reducing-side linear control valve 13 in the embodiment will be described.

First, basic operations of the pressure-increasing-side linear control valve 12 and the pressure-reducing-side linear control valve 13 will be described.

In a state in which the pressure-increasing-side linear control valve 12 is closed and the pressure-reducing-side linear control valve 13 is opened, the hydraulic liquid in the pilot chamber 27 flows out and the volume of the pilot chamber 27 is reduced. Eventually, the pressure of the hydraulic liquid in a master cylinder, which is not illustrated, for actually driving the brake will be reduced.

On the other hand, in a state in which the pressure-increasing-side linear control valve 12 is opened and the pressure-reducing-side linear control valve 13 is closed, high pressure hydraulic liquid is accumulated in the accumulator 18 via the hydraulic pressure pump 17 driven by the motor 16. At the same time, the high pressure hydraulic liquid flows into the pilot chamber 27 via the port 21A1, the port 21A2, and the pressure-increasing-side linear control valve 12, and the volume of the pilot chamber 27 is increased. Consequently, the high pressure hydraulic liquid increases the pressure of the hydraulic liquid in the master cylinder, which is not illustrated, for actually driving the brake, and exerts the breaking force.

In the above-described operation, hysteresis is present in the pressure-increasing-side linear control valve 12 and the pressure-reducing-side linear control valve 13, when the valve opening degree is increased and when the valve opening degree is reduced.

The hysteresis will now be described.

Figure 2:
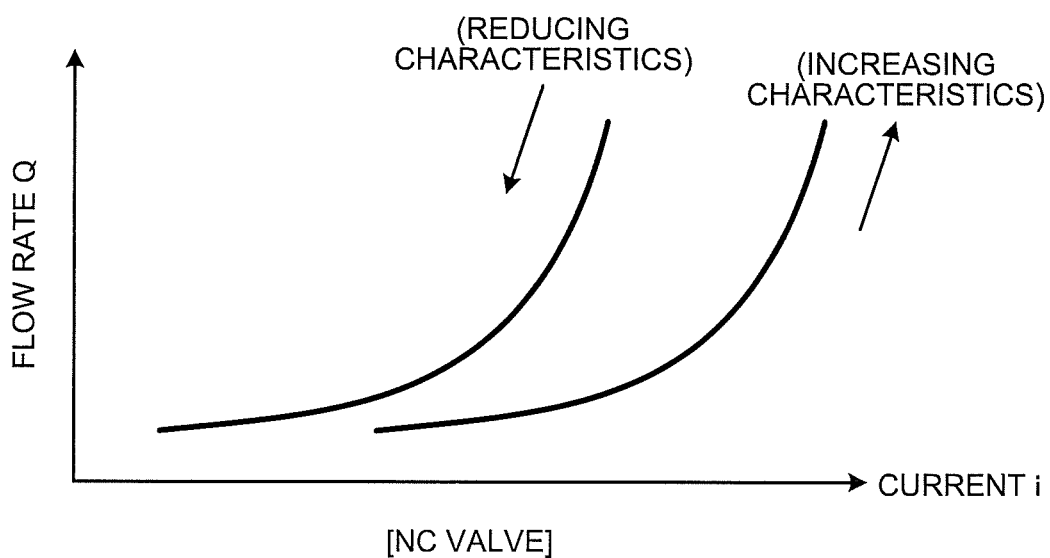
FIG. 2 is an explanatory diagram of hysteresis in a normally closed type control valve.

FIG. 2 is an explanatory diagram of hysteresis in a normally closed type control valve.

Figure 3:
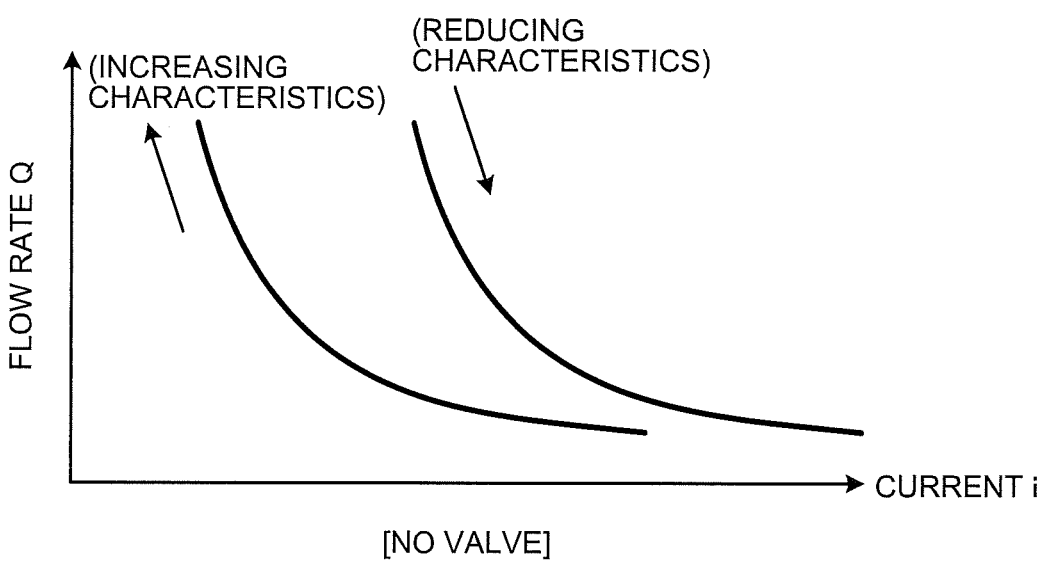
FIG. 3 is an explanatory diagram of hysteresis in a normally open type control valve.

FIG. 3 is an explanatory diagram of hysteresis in a normally open type control valve.

As illustrated in FIG. 2, in the normally closed type control valve such as the pressure-increasing-side linear control valve 12 in the present embodiment, when the flow rate Q is the same, the current amount of the control current i is small when the control valve is operating in the direction in which the opening degree is reduced (in the reducing characteristics), compared to when the control valve is operating in the direction in which the opening degree is increased (in the increasing characteristics).

On the other hand, as illustrated in FIG. 3, in the normally open type control valve such as the pressure-reducing-side linear control valve 13 of the present embodiment, when the flow rate Q is the same, the current amount of the control current i is small when the control valve is operating in the direction in which the opening degree is increased (in the increasing characteristics), compared to when the control valve is operating in the direction in which the opening degree is reduced (in the reducing characteristics).

Consequently, in either case, when the direction in which the opening degree is changed, is changed (for example, when the direction is changed from the direction in which the opening degree is increased to the direction in which the opening degree is reduced), it is possible to bring the output of the pressure-increasing-side linear control valve 12 or the output of the pressure-reducing-side linear control valve 13 close to the target (target value), by taking hysteresis into account (for example, switching from the increasing characteristics to the reducing characteristics).

For example, when the linear control valve is feed-forward controlled, the actual opening degree of the linear control value may not reach the opening degree corresponding to the control output, and thus there is a possibility of not being able to accurately control the linear control valve. More specifically, when the control output is switched from being increased to being reduced, the control output is reduced by the above-described reducing control characteristics even though the opening degree of the linear control valve has not increased to the target opening degree, which results in that the opening degree of the linear control valve may not reach the target, and thus it may not be possible to control the valve accurately.

Consequently, in the present embodiment, hysteresis correction (apply the above-described increasing characteristics or the above-described reducing characteristics according to the increasing/reducing direction of the target current) is prohibited until the actual current value becomes substantially equivalent to the target current value. Consequently, by performing the hysteresis correction after the actual current value and the target current value become substantially equivalent, it is possible to suppress unnecessary hysteresis correction while taking the hysteresis into account and bring the output of the linear control valve close to the target, when not only the feedback control but also the feed-forward control is performed, or when only the feed-forward control is performed without performing the feedback control.

Hereinafter, detailed description will be given.

Figure 4:
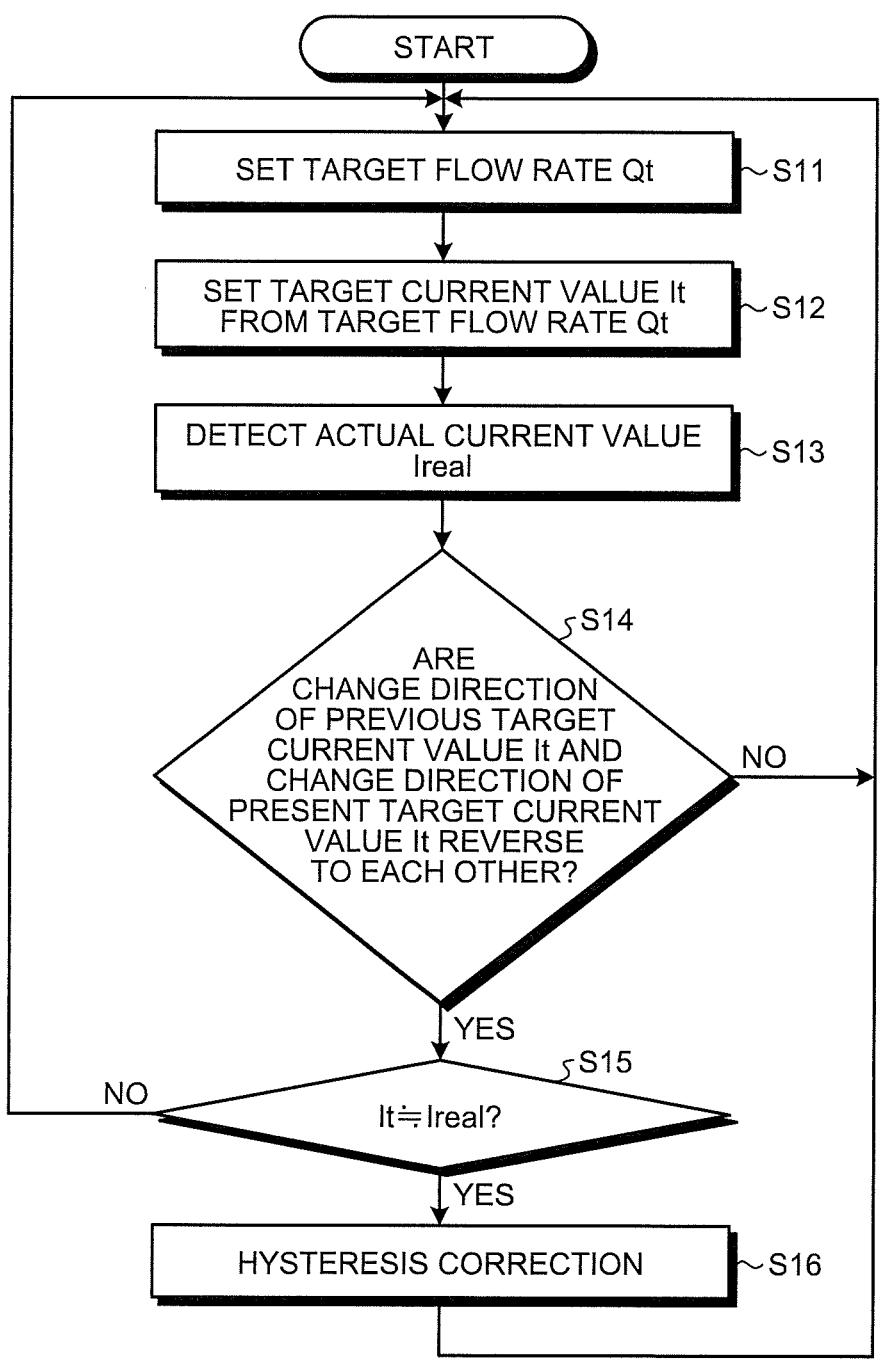
FIG. 4 is a flowchart of a liquid pressure control process of the ECU of an embodiment.

FIG. 4 is a flowchart of a liquid pressure control process of the ECU of an embodiment.

First, the control of the normally closed type control valve such as the pressure-increasing-side linear control valve 12 in the present embodiment will be described.

Figure 5:
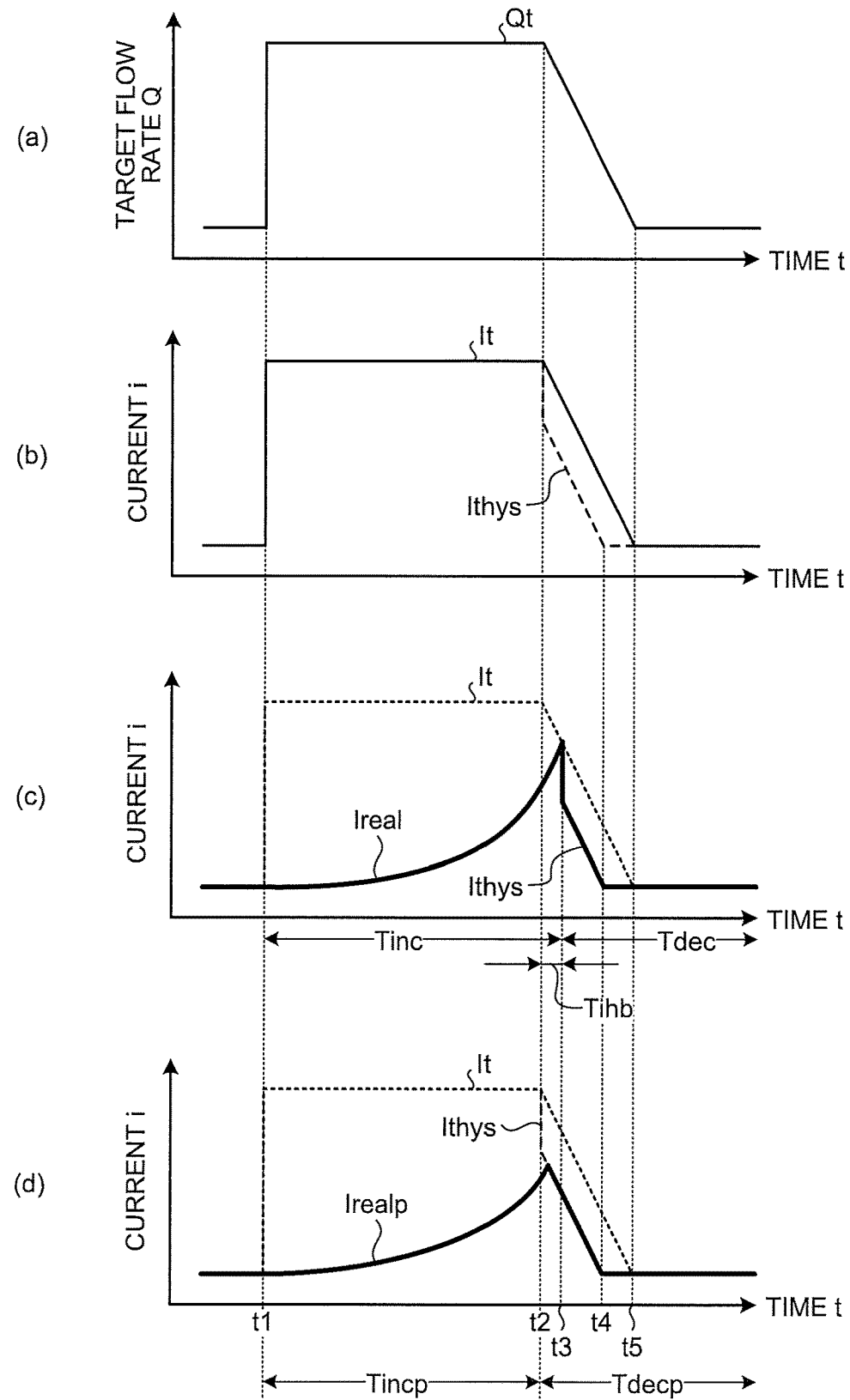
FIG. 5 is an explanatory diagram of an operation of the normally closed type control valve.

FIG. 5 is an explanatory diagram of an operation of hysteresis correction in the normally closed type control valve from the increasing characteristics to the reducing characteristics.

First, it is assumed that the increasing control of increasing the valve opening degree is performed.

Upon detecting that the opening degree of the pressure-increasing-side linear control valve 12 needs to be changed, as illustrated in FIG. 5(*a*), the ECU 11 sets the target flow rate Qt1 that is the target flow rate Qt of the pressure-increasing-side linear control valve 12 (step S11).

As illustrated in FIG. 5(b), the ECU 11 then sets the target current value It from the target flow rate Qt (step S12).

In other words, the target current value It1 is set from the target flow rate Qt1, for the pressure-increasing-side linear control valve 12.

The ECU 11 then starts supplying the electric power supplied from the power source 15 to the pressure-increasing-side linear control valve 12 from the time t1 so that the electric power reaches the target current value It1.

The ECU 11 then detects (or monitors) the real current value Ireal1 that is the actual current value Ireal supplied to the pressure-increasing-side linear control valve 12, in parallel with the electric power supply (driving current supply) to the pressure-increasing-side linear control valve 12 (step S13).

The ECU 11 then determines whether the change direction (increasing direction or reducing direction) of the previous target current value It1 (hereinafter, referred to as the target current value Itp for identification) and the change direction of the present target current value It1 are reverse to each other, on the basis of the settings of the previously set target flow rate Qt1 (hereinafter, referred to as the target flow rate Qtp for identification) and the present target flow rate Qt1 (step S14).

More specifically, while the increasing control is performed, when the previous target flow rate Qtp is smaller than (increasing direction) or equivalent to the present target flow rate Qt1, the ECU 11 determines that the change direction of the previous target current value Itp (increasing direction or reducing direction) and the change direction of the present target current value It1 are the same as each other.

When the previous target flow rate Qtp is larger than the present target flow rate Qt1 (reducing direction), the ECU 11 determines that the change direction of the previous target current value Itp (increasing direction or reducing direction) and the change direction of the present target current value It1 are reverse to each other.

More specifically, in the period between the time t1 and the time t2 illustrated in FIG. 5, according to the settings of the previous target flow rate Qtp and the present target flow rate Qt1, the previous target flow rate Qtp is equivalent to the present target flow rate Qt1, and the change direction of the previous target current value Itp and the change direction of the present target current value It1 are not reverse to each other (No at step S14). Consequently, the ECU 11 sets the same target flow rate Qt1 again (or holds the same target flow rate Qt1), and repeats the same process as described above while keeping the increasing characteristics.

Upon reaching the time t2, as a result of the determination at step S14, it is determined that the previous target flow rate Qtp is larger than the present target flow rate Qt1. Consequently, the ECU 11 determines that the change direction of the previous target current value Itp (increasing direction or reducing direction) and the change direction of the present target current value It1 are reverse to each other (Yes at step S14).

Next, the ECU 11 determines whether the actual current value Ireal1 is within a predetermined value range of the target current value It1, in other words, whether the actual current value Ireal1 satisfies the following equation (step S15):

$$It1-\alpha Ireal1 \leq It+\beta \text{ (predetermined values } \alpha, \beta > 0)$$

In this process, the predetermined value $\alpha$ is a value for absorbing variation in the current value, and the predetermined value $\beta$ is a value for absorbing the overshoot.

As a result of the determination at step S15, when the actual current value Ireal1 in the increasing control satisfies the following equation (No at step S15):

$$It1-\alpha > Ireal1$$

it is determined that the actual current value Ireal1 is outside the predetermined value range of the target current value It1, and the process moves to step S11 again, and the same process is repeated thereafter. More specifically, the above-described process is repeated in the period between the time t2 and the time t3.

In FIG. 5, as represented at the time t3, as a result of the determination at step S15, when the actual current value Ireal1 in the increasing control satisfies the following equation:

$$It1-\alpha Ireal1 (\leq It+\beta)$$

the ECU 11 regards that the actual current value Ireal1 is equivalent to the target current value It1.

As a result, the ECU 11 starts a hysteresis correction, and performs the hysteresis correction in which the current i corresponding to the target flow rate Qt is set to the target current value Ithys (see FIG. 5(b)) after the hysteresis is corrected on the basis of the reducing characteristics (step S16).

Then, the process moves to step S11 again, and the same process as described above is performed.

As a result of these processes, in the increase control period of the normally closed type control value such as the pressure-increasing-side linear control valve 12, as illustrated in FIG. 5(c), the ECU 11 controls the actual current value Ireal1 by the characteristics of the increase control period, up to the time t3 at which the actual current value Ireal1 is regarded to be equivalent to the target current value It1. Consequently, unlike the conventional example illustrated in FIG. 5(d), the period between the time t2 and the time t3 is set as the hysteresis correction prohibited period Tihb during which the hysteresis correction will not be performed.

As a result, the ECU 11 performs the hysteresis correction to the reducing characteristics from the time t3 at which the actual current value Ireal1 is regarded to be equivalent to the target current value It1. Hence, it is possible to suppress unnecessary hysteresis correction while taking the hysteresis into account, control the opening degree of the pressure-increasing-side linear control valve 12 certainly, and bring the output of the pressure-increasing-side linear control valve 12 close to the target.

Next, it is assumed that the reducing control for reducing the valve opening degree is performed in the beginning.

Figure 6:
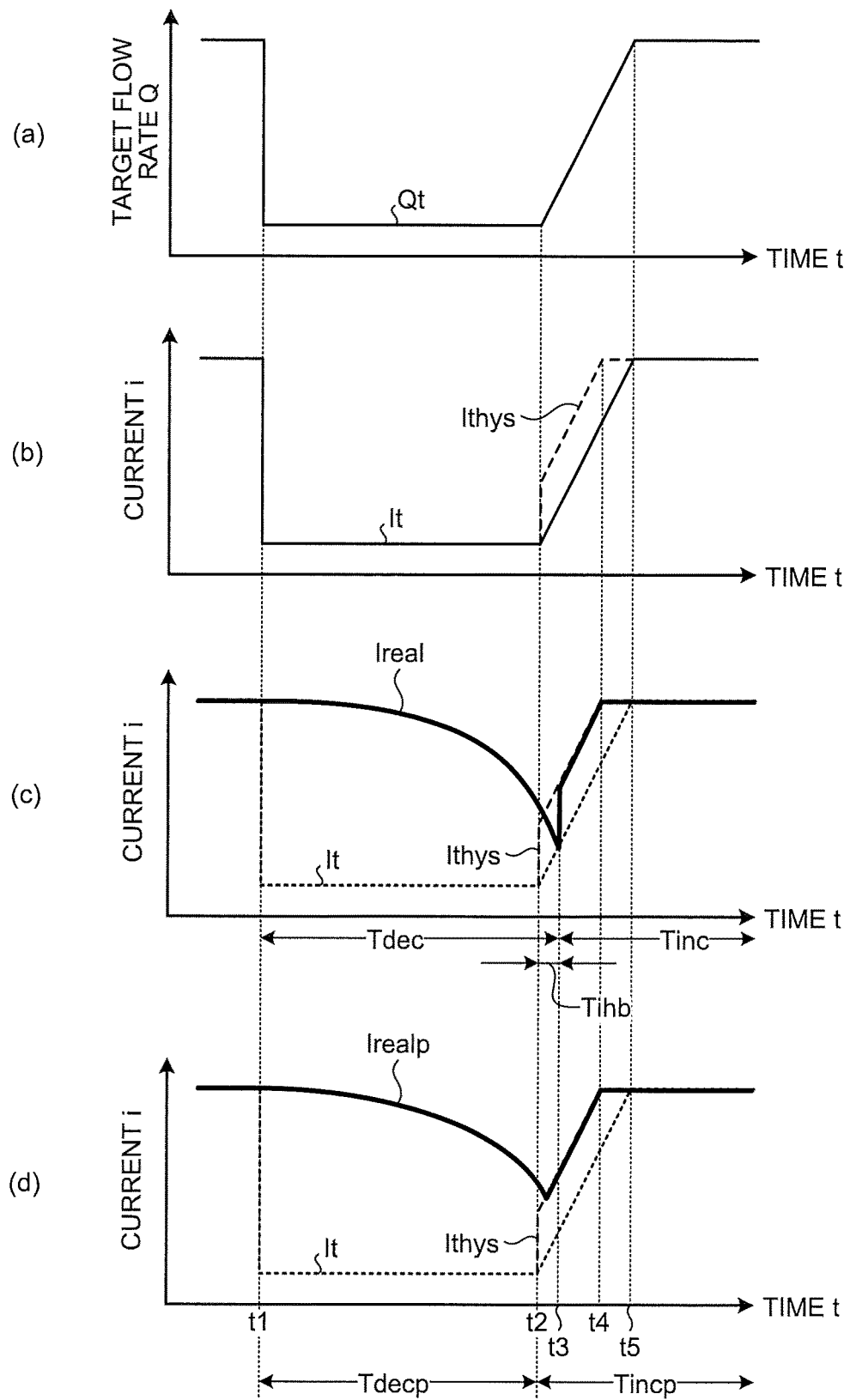
FIG. 6 is an explanatory diagram of an operation of the normally closed type control valve.

FIG. 6 is an explanatory diagram of an operation of hysteresis correction in the normally closed type control valve from the reducing characteristics to the increasing characteristics.

Upon detecting that the opening degree of the pressure-increasing-side linear control valve 12 needs to be changed, as illustrated in FIG. 6(a), the ECU 11 sets the target flow rate Qt1 that is the target flow rate Qt of the pressure-increasing-side linear control valve 12 (step S11).

As illustrated in FIG. 6(b), the ECU 11 then sets the target current value It from the target flow rate Qt (step S12).

In other words, the ECU 11 sets the target current value It1 from the target flow rate Qt1 for the pressure-increasing-side linear control valve 12.

The ECU 11 then starts supplying the electric power supplied from the power source 15 to the pressure-increasing-side linear control valve 12 from the time t1 such that the electric power reaches the target current value It1.

The ECU 11 then detects (or monitors) the actual current value Ireal1 that is the actual current value Ireal supplied to the pressure-increasing-side linear control valve 12, in parallel with the electric power supply (driving current is supplied) to the pressure-increasing-side linear control valve 12 (step S13).

The ECU 11 then determines whether the change direction (increasing direction or reducing direction) of the previous target current value It1 (hereinafter, referred to as the target current value Itp for identification) and the change direction of the present target current value It1 are reverse to each other, on the basis of the settings of the previously set target flow rate Qt1 (hereinafter, referred to as the target flow rate Qtp for identification) and the present target flow rate Qt1 (step S14).

More specifically, in the period between the time t1 and the time t2 illustrated in FIG. 6, according to the settings of the previous target flow rate Qtp and the present target flow rate Qt1, the previous target flow rate Qtp is equivalent to the present target flow rate Qt1, and the change direction of the previous target current value Itp and the change direction of the present target current value It1 are not reverse to each other (No at step S14). Consequently, the ECU 11 sets the same target flow rate Qt1 again (or holds the same target flow rate Qt1), and repeats the same process as described above while keeping the reducing characteristics.

Upon reaching the time t2, as a result of the determination at step S14, it is determined that the previous target flow rate Qtp is smaller than the present target flow rate Qt1. Consequently, the ECU 11 determines that the change direction of the previous target current value Itp (increasing direction or reducing direction) and the change direction of the present target current value It1 are reverse to each other (Yes at step S14).

Next, the ECU 11 determines whether the actual current value Ireal1 is within a predetermined value range of the target current value It1, in other words, whether the actual current value Ireal1 satisfies the following equation (step S15):

$$It1-\alpha Ireal1 \geq It+\beta \text{ (predetermined values } \alpha, \beta > 0)$$

In this process, the predetermined value $\alpha$ is a value for absorbing variation in the current value and the predetermined value $\beta$ is a value for absorbing the overshoot.

As a result of the determination at step S15, when the actual current value Ireal1 in the increasing control satisfies the following equation (No at step S15):

$$It1-\alpha < Ireal1$$

the ECU 11 determines that the actual current value Ireal1 is outside the predetermined value range of the target current value It1, moves the process to step S11 again, and repeats the same process thereafter. More specifically, the above-described process is repeated in the period between the time t2 and the time t3.

In FIG. 6, as represented at the time t3, as a result of the determination at step S15, when the actual current value Ireal1 in the reducing control satisfies the following equation:

$$It1-\alpha \geq Ireal1 (\geq It+\beta)$$

the ECU 11 regards that the actual current value Ireal1 is equivalent to the target current value It1.

As a result, the ECU 11 starts a hysteresis correction, and performs the hysteresis correction in which the current i corresponding to the target flow rate Qt is set to the target current value Ithys (see FIG. 6(b)) after the hysteresis is corrected on the basis of the increasing characteristics (step S16).

The ECU 11 then moves the process to step S11 again, and performs the same process as described above.

As a result of these processes, in the increase control period Tinc of the normally closed type control value such as the pressure-increasing-side linear control valve 12, as illustrated in FIG. 6(c), the ECU 11 controls the actual current value Ireal1 by the characteristics of the reduce control period, until the time t3 at which the actual current value Ireal1 is regarded to be equivalent to the target current value It1. Consequently, unlike the conventional example illustrated in FIG. 6(d), the period between the time t2 and the time t3 is set as the hysteresis correction prohibited period Tihb during which the hysteresis correction will not be performed.

As a result, the ECU 11 performs the hysteresis correction to the increasing characteristics from the time t3 at which the actual current value Ireal1 is regarded to be equivalent to the target current value It1. Hence, it is possible to suppress unnecessary hysteresis correction while taking the hysteresis into account, control the opening degree of the pressure-increasing-side linear control valve 12 certainly, and bring the output of the pressure-increasing-side linear control valve 12 close to the target.

The operation of the normally closed type control valve has been described above. However, when the normally open type control valve such as the pressure-reducing-side linear control valve 13 of the present embodiment is used to control the flow rate corresponding to FIG. 5(a), the same control as that illustrated in FIG. 6(b) and FIG. 6(c) may be performed. When the normally open type control valve such as the pressure-reducing-side linear control valve 13 of the present embodiment is used to control the flow rate corresponding to FIG. 6(a), it is possible to control the opening degree of the pressure-reducing-side linear control valve 13 certainly, and bring the output of the pressure-reducing-side linear control valve 13 close to the target, by performing the control similar to that illustrated in FIG. 5(b) and FIG. 5(c).

As described above, with the present embodiment, it is possible to bring the output of the pressure-increasing-side linear control valve 12 and the output of the pressure-reducing-side linear control valve 13 close to the targets (target values). Thus, with the liquid pressure control device, it is possible to bring the pilot pressure close to the target with good responsiveness. Consequently, it is possible to adjust the pressure and the flow rate of the fluid to be supplied to the controlled object, and when the controlled object is the braking device of a vehicle, it is possible to cause the braking device to execute the aimed braking operation with good responsiveness.

While the embodiment of the present invention has been described, the above-described embodiment is merely an example, and it is not intended to limit the scope of the invention. The above-described embodiment may be implemented in various other forms, and various omissions, replacements, combinations, and modifications may be made without departing from the scope and spirit of the invention. Moreover, the specifications (including the structure, type, direction, shape, size, length, width, thickness, height, number, arrangement, position, material, and the like) such as the configuration and the shape can be suitably modified.

For example, the ECU 11 is a central processing unit (CPU) that operates according to software. At least a part of the ECU 11 may be hardware such as a field programmable gate array (FPGA), a programmable logic device (PLD), a digital signal processor (DSP), an application specific integrated circuit (ASIC).

In the above description, the liquid pressure control device is feed-forward controlled. However, even when the liquid pressure control device is feedback controlled, the above description is also applicable and it is possible to perform more accurate control.

The invention claimed is:

1. A valve control device comprising:
   a correction unit configured to correct hysteresis in output of a control valve according to an increasing/reducing direction of a control output value;
   a detection unit configured to detect an actual output value to the control valve corresponding to the control output value; and
   a forbidding unit configured to forbid correction by the correction unit, until a difference between the control output value and the actual output value becomes within a predetermined range, after the increasing/reducing direction of the control output value is switched.

2. The valve control device according to claim 1, further comprising a control unit configured to control the control valve and supply driving current to the control valve, wherein
   the control valve is a linear control valve,
   the control output value is a value of target current for the linear control valve set by the control unit, and
   the actual output value is a value of actual current that is actually supplied to the linear control valve by the control unit.

3. The valve control device according to claim 2, wherein the control unit is configured to separately control a pressure-increasing-side linear control valve for increasing pressure or flow rate of a fluid when adjusting the pressure or the flow rate of the fluid to be supplied to a controlled object, and a pressure-reducing-side linear control valve for reducing pressure or flow rate of a fluid when adjusting the pressure or the flow rate of the fluid to be supplied to the controlled object, and adjust pilot pressure.

4. The valve control device according to claim 2, wherein the control unit is configured to set the control output value by a feed-forward control.

5. A liquid pressure control device comprising:
   a pressure-increasing-side linear control valve configured to increase pressure or flow rate of a fluid to be supplied to a controlled object when adjusting the pressure or the flow rate of the fluid;
   a pressure-reducing-side linear control valve configured to reduce pressure or flow rate of a fluid to be supplied to the controlled object when adjusting the pressure or the flow rate of the fluid; and
   a valve control device configured to separately control the pressure-increasing-side linear control valve and the pressure-reducing-side linear control valve, to adjust pilot pressure and adjust the pressure or the flow rate of the fluid to be supplied to the controlled object, wherein
   the valve control device comprises:
      a correction unit configured to separately perform hysteresis corrections on the pressure-increasing-side linear control valve and the pressure-reducing-side linear control valve having hysteresis in outputs, according to increasing/reducing directions of target values of control outputs; and
      a control unit configured to forbid the hysteresis corrections until differences between the target values and actual output values of the control outputs become within predetermined ranges, when the target values of the control outputs are switched to reverse directions.

6. A valve control method comprising:
   correcting hysteresis in output of a control valve according to an increasing/reducing direction of a control output value;
   detecting an actual output value to the control valve corresponding to the control output value; and
   forbidding the correcting until a difference between the control output value and the actual output value becomes within a predetermined range, after the increasing/reducing direction of the control output value is switched.

* * * * *